US009183114B2

(12) United States Patent
Rangarajan et al.

(10) Patent No.: US 9,183,114 B2
(45) Date of Patent: Nov. 10, 2015

(54) ERROR DETECTION ON THE STACK

(75) Inventors: Kumar Rangarajan, Bangalore (IN); Jonathan M. Sanders, Los Gatos, CA (US); Tanuj Vohra, Campbell, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1490 days.

(21) Appl. No.: 11/306,396

(22) Filed: Dec. 27, 2005

(65) Prior Publication Data

US 2007/0150879 A1 Jun. 28, 2007

(51) Int. Cl.
G06F 9/44 (2006.01)
G06F 11/36 (2006.01)
G06F 9/445 (2006.01)

(52) U.S. Cl.
CPC ........ *G06F 11/3636* (2013.01); *G06F 9/44589* (2013.01); *G06F 11/36* (2013.01); *G06F 11/362* (2013.01); *G06F 11/364* (2013.01); *G06F 11/3612* (2013.01)

(58) Field of Classification Search
None
See application file for complete search history.

(56) References Cited

U.S. PATENT DOCUMENTS

| 4,807,185 | A | | 2/1989 | Kamiya |
| 5,067,105 | A | | 11/1991 | Borkenhagen et al. |
| 5,265,254 | A | * | 11/1993 | Blasciak et al. ............... 717/130 |
| 5,444,722 | A | | 8/1995 | Tran |
| 5,541,942 | A | * | 7/1996 | Strouss ......................... 714/720 |
| 5,835,926 | A | | 11/1998 | Pesuit |
| 5,930,814 | A | | 7/1999 | Lepejian et al. |
| 6,206,584 | B1 | * | 3/2001 | Hastings ........................ 714/35 |
| 6,282,624 | B1 | | 8/2001 | Kimura et al. |
| 6,640,293 | B1 | | 10/2003 | Paredes et al. |
| 2004/0015809 | A1 | * | 1/2004 | Cheng ........................... 717/100 |
| 2004/0071009 | A1 | | 4/2004 | Chai et al. |

OTHER PUBLICATIONS

Pizzi Cesare, "Memory Access Error Checkers", May 1999, Linux Journal, vol. 1999, Issue 61, Article 26.*
Richard W M Jones, "Backwards-compatible bounds checking for arrays and pointers in C programs", In Proceedings of the 3rd International Workshop on Automatic Debugging, 1997.*
Diomidis Spinellis, "Checking C Declarations at Link Time", Citeseer, 1993.*
Luiz DeRose, SIGMA: A Simulator Infrastructure to Guide Memory Analysis, IEEE, 2002.*
Shaw, Diagnosis of Dynamic Errors in Computer Programs Only Appearing in Realtime Operation, Elektronik Praxis, Vogal-Verlag, Germany, No. 17, pp. 142-145, Sep. 2000.
Kurtz et al., Extending the Addressing Capabilities of the IBM Series/1 to 32 Bits, IBM Technical Disclosure Bulletin, vol. 29, No. 4, pp. 1494-1501, Sep. 1986.

* cited by examiner

*Primary Examiner* — Lewis A Bullock, Jr.
*Assistant Examiner* — Mark Gooray
(74) *Attorney, Agent, or Firm* — Cuenot, Forsythe & Kim, LLC

(57) ABSTRACT

A method of detecting runtime errors relating to a stack of a computer program can include during compilation of the computer program, inserting dummy variables between declarations in the stack. During execution of the computer program, if at least one of the dummy variables is accessed, a determination can be made that a runtime memory access error has occurred.

13 Claims, 2 Drawing Sheets

ERROR DETECTION ON THE STACK

FIELD OF THE INVENTION

The present invention relates to software development and testing and, more particularly, to detecting runtime memory access errors in stack variables.

DESCRIPTION OF THE RELATED ART

Many modern programming languages do not support programming constructs that prevent runtime memory corruption errors. Runtime memory corruption errors can include, but are not limited to, reading or writing from uninitialized memory, reading or writing beyond the bounds of a defined array, memory leaks, free memory access, and the like. One example of a modern programming language that does not support constructs to prevent such actions is the C or C++ programming language. When a program written in C or C++ is compiled, runtime memory corruption errors, such as the ones noted above, typically go undetected.

In illustration, within the C or C++ programming language, it is legal for a developer to define an array of a particular size and then access elements beyond the size of that array. Consider the following exemplary code:

int a[5], i;
for (i=0; i<=5, i++)
a[i]=i+5

This portion of programming code will attempt to access a 6th element of a 5 element array. As noted, most compilers will not detect such an error.

While some compilers may be more sophisticated and have the ability to detect an error such as the one illustrated above, other more complex runtime errors typically go unnoticed. Continuing with the previous example, if the value of "i" is a user-provided value that is received during program execution; presently available compilers would be unable to detect the case where an attempt is made to access an array element beyond the array, i.e. a 6 th element of a 5 element array. Further, it may be the case that when the code is executed and an attempt is made to access the 6th array element, a valid stack address is being accessed. If the value at this location is mistakenly read or overwritten, a critical execution error can result.

While runtime memory corruption errors are difficult to identify, several solutions have been proposed. One variety of runtime analysis tool utilizes a technique called source code instrumentation (SCI). An SCI-based tool inserts statements at various points within the source code of the computer program under test to ensure that the memory contents are accurate. In illustration, if the computer program being analyzed sets the variable i=j, an SCI-based tool can insert code into the computer program at compile time to check the memory address for the variable j prior to initialization.

Another proposed solution has been to utilize a runtime analysis tool that utilizes object code insertion (OCI). OCI-based tools take object code from the output of a compiler and insert the object code into the computer program under test. The inserted object code performs various checks and reporting functions. Error checking performed by most OCI runtime analysis tools, as is the case with SCI-based tools, is limited to checking for accesses beyond the boundaries of the stack of the computer program under test as a whole.

It would be beneficial to provide a solution for detecting runtime memory corruption errors that overcomes the deficiencies described above.

SUMMARY OF THE INVENTION

The present invention provides a method and apparatus for detecting a runtime memory access error on a stack of a computer program. One embodiment of the present invention can include, during compilation of the computer program, inserting dummy variables between declarations in the stack. During execution of the computer program, if at least one of the dummy variables is accessed, a determination can be made that a runtime memory access error has occurred.

Another embodiment of the present invention can include a method of detecting runtime errors within a computer program. The method can include, during compilation of the computer program, inserting dummy variables between declarations in the stack and storing, within each dummy variable, a predetermined bit pattern. During execution of the computer program, the method can include identifying accesses to at least one of the dummy variables and determining that a runtime memory access error occurred if an access to at least one of the dummy variables is identified.

Another embodiment of the present invention can include a machine readable storage, having stored thereon, a computer program having a plurality of code sections executable by a machine for causing the machine to perform the various steps and methods disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a solution for detecting runtime memory access errors within a computer program. In accordance with the inventive arrangements disclosed herein, dummy variables can be inserted, or added, between declarations on the stack of a computer program that is undergoing testing and/or analysis. The dummy variables can be sprayed with a predetermined bit pattern. In one embodiment, during execution of the computer program under test, or at some point thereafter, the contents of the dummy variables can be analyzed to determine whether the contents have been changed. In another embodiment, read and/or write accesses to the dummy variables can be monitored to flag accesses to the dummy variables.

In general, runtime analysis refers to the practice of understanding application behavior using data collected during execution of a program under test. By inserting dummy variables between declarations on the stack, runtime memory access errors can be detected with increased granularity. That is, rather than detecting only whether a read and/or a write has gone beyond the bounds of the stack as a whole, the present invention can identify instances where reads or writes to the stack go beyond the portions of the stack that have been reserved and/or allotted to a particular variable, whether an individual variable or an array.

Figure 1:
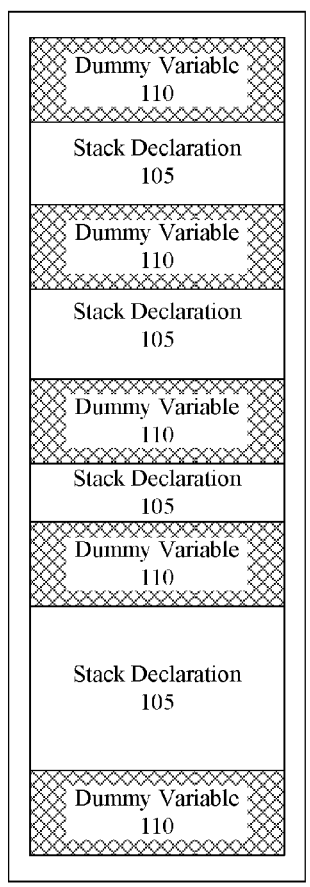
FIG. 1 is a schematic diagram illustrating a stack of an executing computer program that has been compiled in accordance with one embodiment of the present invention.

FIG. 1 is a schematic diagram illustrating a stack 100 of an executing computer program that has been compiled in accordance with one embodiment of the present invention. As shown, stack 100 includes one or more dummy variables 110 disposed between consecutive declarations 105. As used herein, a declaration can be a variable, an array, or any reserved portion of stack memory that is originally defined by the computer program under test. A dummy variable 110 can include a variable or other reserved portion of stack memory that is not defined by the computer program under test, but rather is inserted by a compiler or other analysis tool during compilation of the computer program under test as described herein. Further, the dummy variables 110 are identifiable as each can be sprayed, or written, with a predetermined bit pattern.

In accordance with the inventive arrangements disclosed herein, dummy variables can be inserted, or included, within the stack 100 of a computer program under test. Dummy variables 110 can be inserted automatically by a suitably modified compiler. As shown, one dummy variable 110 can be created and inserted between each declaration 105 on the stack 100 during compilation of the computer program under test. Further, a dummy variable 110 can be inserted immediately prior to the first declaration 105 on stack 100 and immediately following the last declaration 105 on stack 100.

Figures 2, 3:
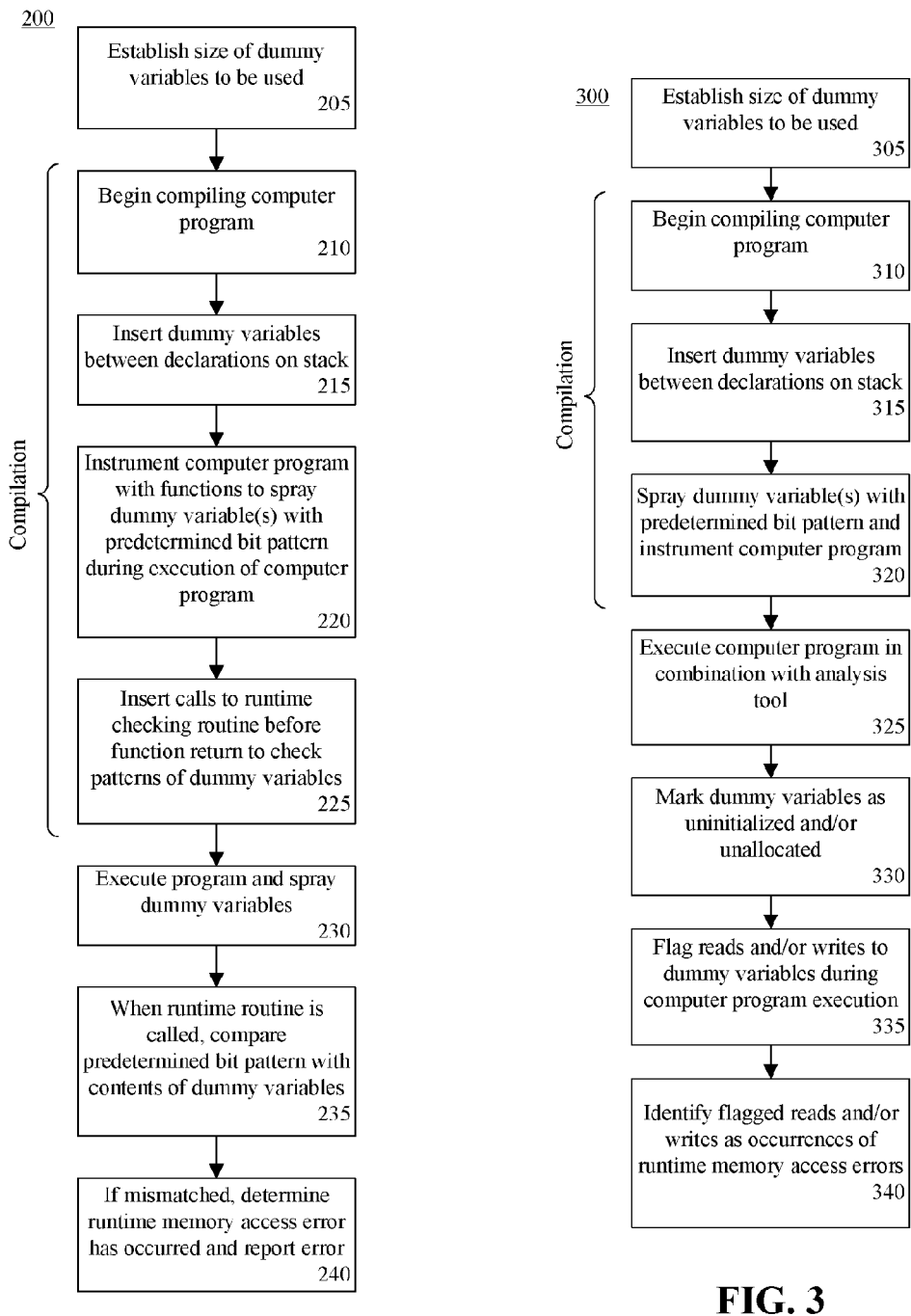
FIG. 2 is a flow chart illustrating a method of detecting runtime memory access errors in accordance with one embodiment of the present invention.
FIG. 3 is a flow chart illustrating a method of detecting runtime memory access errors in accordance with another embodiment of the present invention.

FIG. 2 is a flow chart illustrating a method 200 of detecting runtime memory access errors in accordance with one embodiment of the present invention. The method can be implemented using a compiler that has been modified, or configured, in accordance with the inventive arrangements disclosed herein.

In one embodiment, for example, software-based tool(s) such as those from the Rational® PurifyPlus family of software analysis tools which are commercially available from International Business Machines Corporation of Armonk, N.Y. (IBM) can be used. PurifyPlus is a family of computer programs that provides runtime analysis functionality to software developers and testers. The various development activities that can be analyzed using PurifyPlus can include, but are not limited to, memory corruption detection and memory profiling in native C/C++ applications, memory profiling in Java and NET managed code applications, performance profiling to identify slow or inefficient portions of code, code coverage analysis, and runtime tracing.

The present invention further can include functionality for generating call graphs via runtime analysis. A tool called Quantify, for example, which is a member of the PurifyPlus product family, can produce call graphs for a program under test. In general, a call graph refers to a diagram that identifies the functions, methods, and/or modules in a system or computer program and shows which functions, methods, and/or modules invoke one another. A call graph also can be referred to as a call tree or a tier chart. In any case, such functionality can identify those portions of a computer program under test that are responsible for accessing one or more of the dummy variables.

The various examples of runtime analysis tools discussed herein are provided for purposes of illustration only. The examples noted are not intended to limit the present invention in any way or to suggest that one particular product or tool must be used. Rather, the examples are intended to provide a better understanding of the inventive arrangements. Thus, it should be appreciated that other runtime analysis tools can be used if suitably configured in accordance with the embodiments disclosed herein.

Accordingly, method 200 can begin in step 205, where the size and/or type of dummy variables to be inserted on the stack can be set. As known, available variable types can include, but are not limited to, a byte-length integer, a short integer, an integer, a long integer, single precision floating point, double precision floating point, a single character, a Boolean, or the like. The available variable types will vary according to the particular programming language used. In any case, in one embodiment, the size as well as the variable type can be user-defined settings that can be provided to the compiler, for example via a graphical user interface (GUI).

In another embodiment, the size and/or type of dummy variables can be set using a compiler directive that is included as a compile-time option to the program under test, i.e. the program to be compiled and evaluated. For example, a developer can insert a statement such as the compiler directive: "cc-insert-stack-pads-with-size=8 . . . foo.c". This statement can instruct the compiler that a series of dummy variables are to be generated having a size of 8 bytes. The directive can generate the following code:

int i[10];
    double pad1; // first pad variable of 8 bytes
    int j[10];
    double pad2; // second pad variable
    int*k;
    double pad3; // third pad variable at end of stack frame In step 210, the compiler can begin compiling the source code of the computer program. The user specified options regarding the size and/or type of the dummy variables can be identified and/or observed. It should be appreciated that if no particular size and/or type is specified for the dummy variables, the compiler can select a default size and/or type automatically.

In step 215, dummy variables are inserted and/or created between each declaration on the stack of the computer program during compilation. As noted, dummy variables further can be inserted at the beginning of the stack and at the end of the stack. In step 220, during compilation of the computer program, the compiler can insert one or more calls to runtime routines that are part of an analysis library of functions not originally part of the computer program under test. These functions can be located at function entry points and can initialize the dummy variables with a predetermined bit pattern. Accordingly, upon execution of the instrumented computer program, or the program under test, the locations on the stack of the computer program that correspond to the dummy variables can be initialized with the predetermined bit pattern as a result of executing the inserted code.

In step 225, during compilation of the computer program, the compiler can insert one or more calls to runtime checking routine(s) that are part of an analysis library of functions not originally part of the computer program under test. The runtime checking routine(s) can be configured to check the contents of the dummy variables inserted onto the stack. The runtime checking routine(s), when called during execution of the computer program, can check whether the contents of the dummy variables correspond, or match, the predetermined bit pattern to which each dummy variable was initialized. The calls to the runtime checking routine(s) can be inserted prior to function returns within the computer program under test.

It should be appreciated that modifications to the computer program under test can be performed using any of a variety of different techniques. For example, in one embodiment, the computer program under test can be modified using a source code insertion (SCI) based tool. In another embodiment, the computer program under test can be modified using an object code insertion (OCI) based tool.

In any case, in step 230, after compilation, the program under test can be executed. The dummy variables can be sprayed by executing the inserted calls to the routine(s) in the function library at function entry points. In step 235, when the runtime checking routine(s) that were inserted into the program under test are called, i.e., prior to function returns, the checking routine(s) compare the contents of the dummy variables with the predetermined bit pattern to determine whether one or more of the dummy variables, or contents thereof, have been overwritten or modified in any way.

In step 240, if a mismatch between one or more dummy variables and the predetermined bit pattern is detected by the runtime checking routine(s), a determination can be made that a runtime memory access error has occurred. Accordingly, the error can be reported. It should be appreciated that while the execution of the computer program under test can be stopped or likely will stop due to the critical nature of such an error, in another embodiment, the program under test can continue executing. In that case, accesses to the dummy variables as well as the contents of the dummy variables can be recorded, for example to a file or a location in memory, for later analysis.

Method 200, as illustrated in FIG. 2, can detect particular types of runtime memory corruption errors, including array bound write errors. This technique, however, may be unable to detect selected instances where the computer program under test reads from a dummy variable, but otherwise, does not alter or modify the contents of the dummy variable in any way. While such a situation can cause an error and, therefore may be detected, it also may go unnoticed since a comparison of the dummy variable contents with the predetermined bit pattern would indicate no difference or change.

FIG. 3 is a flow chart illustrating a method 300 of detecting runtime memory access errors in accordance with another embodiment of the present invention. The embodiment illustrated in method 300 is similar to that illustrated with reference to FIG. 2, with the exception that one or more of the steps and/or functions are performed through the use of a software analysis tool that can execute in conjunction with the computer program under test. The embodiment illustrated with reference to FIG. 3 does not rely upon identifying a mismatch between the dummy variable contents and the predetermined bit pattern to detect a runtime memory access error.

Method 300 can be implemented using a runtime analysis tool similar to those described herein. Accordingly, method 300 can begin in step 305 where the size and/or type of the dummy variables to be used can be established. In step 310, the compiler can begin compiling the computer program under test. In step 315, during compilation, the dummy variables, or pads, can be inserted or defined, between the declarations to be included on the stack.

In step 320, the compiler can spray the dummy variables with a predetermined bit pattern and the program under test can be instrumented with one or more runtime analysis functions. For example, the compiled program under test can be processed by an instrumentation engine which identifies read and write instructions. The program under test is instrumented by inserting calls to runtime analysis functions to which the address of the location being read or written is passed during program execution. The runtime analysis tool can maintain an internal table for tracking the state of every byte of allocated user memory. The table is used to detect erroneous memory accesses.

In step 325, after the computer program under test has been compiled, the computer program can be executed. As noted, the computer program under test can be executed in conjunction with the runtime analysis tool. In step 330, the runtime analysis tool can mark the dummy variables as uninitialized and/or unallocated. The process of marking variables in this manner can entail searching the stack of the computer program under test for locations having the predetermined bit pattern. Any locations on the stack having the predetermined bit pattern, can be identified as dummy variables and marked as uninitialized and/or unallocated.

In step 335, as the computer program under test executes, the runtime analysis tool can flag instances of reads or writes to the dummy variables. In step 340, the flagged instances of read and/or write operations can be determined to be occurrences of runtime memory access errors. Such errors can be indicated to the developer. As noted, for example, a call chain responsible for such an access can be indicated to a user by the runtime analysis tool if so desired. In any case, further analysis can be performed such as determining whether the predetermined bit pattern has been modified and/or altered in any way. While such information can be valuable in terms of diagnosing a runtime memory access error, the detection of an access to a dummy variable, whether a read or a write, without analysis of the contents of the dummy variable also can indicate an instance of the computer program under test accessing an invalid memory location, i.e. a runtime memory access error.

The embodiments disclosed herein provide solutions for detecting runtime memory access errors on a stack of a computer program. In one aspect, during compilation of the computer program, dummy variables can be inserted between declarations in the stack. If the computer program is executed using an OCI-based runtime analysis tool, for example, which checks every load and store memory operation, and at runtime if at least one of the dummy variables is accessed, a determination can be made that a runtime memory access error has occurred.

Another embodiment of the present invention can include a method wherein the dummy variables are inserted into the computer program during compilation between declarations in the stack. The compiler further can generate code at function entry points to store within each dummy variable a predetermined bit pattern. The compiler also can insert checking code at function returns which checks the dummy variables for their stored values. During execution of the function, if any of the dummy variables have been written into, the checking code can determine that a runtime memory error has occurred.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of detecting runtime errors relating to a stack of a computer program, said method comprising:
    during compilation of the computer program, inserting dummy variables between declarations in the stack in response to a user input, wherein the user input is a compiler directive statement or a compiler setting provided to a compiler specifically requesting insertion of the dummy variables having a predetermined bit pattern, wherein the predetermined bit pattern has a user defined size and type and inserting the dummy variables in the stack further comprises:
        inserting a dummy variable immediately prior to a first declaration of the stack; and
        inserting a dummy variable immediately following a last declaration on the stack;
    executing the computer program; and
    during execution of the computer program:
        searching, by a processor, a stack of the computer program for the predetermined bit pattern and identifying at least one location of the stack having the predetermined bit pattern;
        responsive to identifying the at least one location of the stack having the predetermined bit pattern, identifying, by the processor, the at least one location as being the dummy variable and marking the location of the stack as being uninitialized and unallocated;
        identifying the uninitialized and unallocated location of the stack being accessed during execution of the computer program; and
        responsive to the uninitialized and unallocated location of the stack being least one of the dummy variables is accessed during execution of the computer program, determining that a runtime memory access error has occurred.

2. The method of claim 1, wherein inserting the dummy variables between the declarations in the stack comprises spraying the dummy variables with the predetermined bit pattern.

3. The method of claim 2, further comprising, during execution of the computer program, identifying the dummy variables by virtue of the predetermined bit pattern, wherein read or write accesses to a dummy variable are detectable.

4. The method of claim 1, further comprising:
    during compilation, inserting a call to a runtime analysis routine at selected locations within the computer program;
    wherein identifying the uninitialized and unallocated location of the stack being accessed during execution of the computer program is performed by the processor executing the runtime analysis routine.

5. The method of claim 1 wherein inserting dummy variables between declarations in the stack further comprises inserting the dummy variables between selected declarations on the stack.

6. A processing system for detecting runtime errors within a computer program comprising:
    a processor and memory configured to:
    during compilation of the computer program, inserting dummy variables between declarations in a stack of the computer program, wherein the dummy variables are provided in response to a user input, wherein the user input is a compiler directive statement or a compiler setting to a compiler specifically requesting insertion of the dummy variables of a particular user-defined size, type and a predetermined bit pattern;
    wherein inserting the dummy variables in the stack further comprises:
        inserting a dummy variable immediately prior to a first declaration of the stack; and
        inserting a dummy variable immediately following a last declaration on the stack;
    executing the computer program;
    during execution of the computer program:
        searching, by a processor, a stack of the computer program for the predetermined bit pattern and identifying at least one location of the stack having the predetermined bit pattern;
        responsive to identifying the at least one location of the stack having the predetermined bit pattern, identifying, by the processor, the at least one location as being the dummy variable and marking the location of the stack as being uninitialized and unallocated;
        identifying the uninitialized and unallocated location of the stack being accessed during execution of the computer program; and
        responsive to the uninitialized and unallocated location of the stack being accessed during execution of the computer program, determining that a runtime memory access error has occurred.

7. The processing system of claim 6, further comprising:
    during compilation of the computer program, inserting at least one call to locations within the computer program;

wherein identifying the uninitialized and unallocated location of the stack being accessed during execution of the computer program is performed by the processor executing the runtime analysis routine.

8. The processing system of claim 6, wherein identifying the at least one location of the stack having the predetermined bit pattern, and identifying the at least one location as being the dummy variable and marking the location of the stack as being uninitialized and unallocated, are performed by the processor executing a software-based runtime analysis tool executing in combination with said computer program.

9. The processing system of claim 6, wherein inserting the dummy variables between declarations in the stack further comprises inserting the dummy variables between selected declarations on the stack.

10. A machine readable storage memory, having stored thereon a computer program code having a plurality of code sections executable by a processor, the plurality of code sections comprising:
- code for, during compilation of a computer program, inserting dummy variables between declarations in a stack of the computer program in response to a user input, wherein the user input is a compiler directive statement or a compiler setting provided to a compiler specifically requesting insertion of the dummy variables having a predetermined bit pattern, wherein the predetermined bit pattern has a user defined size and type and inserting dummy variables in the stack further comprises:
  - inserting a dummy variable immediately prior to a first declaration of the stack; and
  - inserting dummy variable immediately following a last declaration on the stack;
- code for executing the computer program; and
- code for, during execution of the computer program:
  - searching, by a processor, a stack of the computer program for the predetermined bit pattern and identifying at least one location of the stack having the predetermined bit pattern;
  - responsive to identifying the at least one location of the stack having the predetermined bit pattern, identifying, by the processor, the at least one location as being the dummy variable and marking the location of the stack as being uninitialized and unallocated;
  - identifying the uninitialized and unallocated location of the stack being accessed during execution of the computer program; and
  - responsive to the uninitialized and unallocated location of the stack being accessed during execution of the computer program, determining that a runtime memory access error has occurred.

11. The machine readable storage memory of claim 10, wherein the code for inserting the dummy variables in the stack comprises code for spraying the dummy variables with the predetermined bit pattern.

12. The machine readable storage memory of claim 11, further comprising:
- code for, during execution of the computer program, identifying the dummy variables by virtue of the predetermined bit pattern, wherein read or write accesses to a dummy variable are detectable.

13. The machine readable storage memory of claim 10, further comprising:
- code for, during compilation, inserting a call to a runtime analysis routine at selected locations within the computer program;
- wherein identifying the uninitialized and unallocated location of the stack being accessed during execution of the computer program is performed by the processor executing the runtime analysis routine.

\* \* \* \* \*